(12) United States Patent
Inserra Imparato et al.

(10) Patent No.: US 8,303,761 B2
(45) Date of Patent: Nov. 6, 2012

(54) METHOD OF MANUFACTURING A CURVED ELEMENT MADE OF COMPOSITE MATERIAL

(75) Inventors: Sabato Inserra Imparato, Gragnano (IT); Vincenzo De Vita, Andria (IT); Luca Di Tommaso, Marano di Napoli (IT); Marc Andrea Doyle, Paris (FR)

(73) Assignees: Alenia Aeronautica S.p.A., Pomigliano d'Arco, Napoli (IT); Cytec Technology Corporation, Wilmington, DE (US)

( * ) Notice: Subject to any disclaimer, the term of this patent is extended or adjusted under 35 U.S.C. 154(b) by 160 days.

(21) Appl. No.: 12/671,008

(22) PCT Filed: Jul. 24, 2008

(86) PCT No.: PCT/IB2008/052968
§ 371 (c)(1),
(2), (4) Date: Jan. 27, 2010

(87) PCT Pub. No.: WO2009/016552
PCT Pub. Date: Feb. 5, 2009

(65) Prior Publication Data
US 2010/0193115 A1 Aug. 5, 2010

(30) Foreign Application Priority Data
Jul. 27, 2007 (IT) .............................. TO2007A0557

(51) Int. Cl.
*B32B 5/08* (2006.01)
*C09J 5/02* (2006.01)
(52) U.S. Cl. ..................... 156/307.5; 156/177; 156/178; 156/307.3

(58) Field of Classification Search .................. 156/166, 156/176, 177, 178
See application file for complete search history.

(56) References Cited

U.S. PATENT DOCUMENTS

| | | | | |
|---|---|---|---|---|
| 4,599,127 A | * | 7/1986 | Cannady et al. | 156/289 |
| 4,741,943 A | * | 5/1988 | Hunt | 428/113 |
| 6,105,902 A | * | 8/2000 | Pettit | 244/119 |
| 6,453,962 B1 | * | 9/2002 | Pratt | 156/351 |

(Continued)

FOREIGN PATENT DOCUMENTS
EP 1 541 312 A1 6/2005
(Continued)

OTHER PUBLICATIONS

Peters, S.T. Handbook of Composites, Second Edition, 1998, pp. 366-372.*

*Primary Examiner* — William Bell
(74) *Attorney, Agent, or Firm* — Merchant & Gould P.C.

(57) ABSTRACT

A method of manufacturing a curved element made of composite material includes: preparing at least one dry, flat reinforcing layer with curved fibers. A resin film is combined with the dry, flat reinforcing layer, and heat and pressure are applied in controlled manner to bring about the infusion of the resin into the reinforcing layer and to obtain at least one layer of pre-infused material. At least one prepreg layer is prepared with straight fibers impregnated with resin compatible with the resin of the pre-infused material. The layer of pre-infused material and the prepreg layer are superimposed on one another to obtain a layered structure. The layered structure, arranged on a shaped support tool is subjected to a polymerization cycle to obtain the curved element.

8 Claims, 5 Drawing Sheets

U.S. PATENT DOCUMENTS

| | | |
|---|---|---|
| 6,508,909 B1 * | 1/2003 | Cerezo Pancorbo et al. .................. 156/306.6 |
| 6,607,626 B2 * | 8/2003 | Taggart ........................ 156/177 |
| 7,469,735 B2 * | 12/2008 | Brown et al. ................. 156/392 |
| 2001/0051251 A1 * | 12/2001 | Noda et al. ................... 428/119 |
| 2003/0042364 A1 * | 3/2003 | Tanaka et al. ................ 244/123 |
| 2003/0104156 A1 | 6/2003 | Osada et al. |
| 2004/0134593 A1 * | 7/2004 | Ishibashi et al. ............. 156/180 |
| 2005/0042410 A1 * | 2/2005 | Sakonjo et al. .............. 428/66.6 |
| 2005/0268832 A1 * | 12/2005 | Beneventi et al. ........... 112/439 |
| 2006/0208135 A1 * | 9/2006 | Liguore et al. ............ 244/117 R |
| 2007/0175575 A1 * | 8/2007 | Rubin et al. ................... 156/221 |
| 2009/0202763 A1 * | 8/2009 | Rose et al. ................... 428/36.1 |

FOREIGN PATENT DOCUMENTS

| | | |
|---|---|---|
| EP | 1 584 462 A2 | 10/2005 |
| EP | 1 775 106 A1 | 4/2007 |
| JP | 02-196609 | 8/1990 |
| WO | WO 2006/119002 A2 | 11/2006 |

\* cited by examiner

METHOD OF MANUFACTURING A CURVED ELEMENT MADE OF COMPOSITE MATERIAL

This application is a National Stage Application of PCT/IB2008/052968, filed 24 Jul. 2008, which claims benefit of Serial No. TO2007A000557, filed 27 Jul. 2007 in Italy and which applications are incorporated herein by reference. To the extent appropriate, a claim of priority is made to each of the above disclosed applications.

BACKGROUND OF THE INVENTION

The present invention relates to a method of manufacturing a curved element made of composite material.

As is known, some important curved structural elements, such as fuselage frames for example, can advantageously be made of composite material to improve their stiffness and reduce weight. These elements often require the carbon, fibreglass or other reinforcing fibres to have the same curved orientation as the structural element to improve its structural efficiency and reduce its weight.

This requirement cannot be satisfied with the use of conventional prepreg composite materials. In fact these are produced from groups of straight fibres, unidirectional fabrics, or strips which are impregnated with resin film in a continuous process. Owing to its continuous nature, the conventional pre-impregnation process is not suitable for the impregnation of reinforcing layers with fibres that are not straight.

Various methods have been developed to overcome the limitations imposed by pre-impregnation and to produce curved structural components but they have some disadvantages.

In particular, processes which partially solve the problem have been developed; these processes enable reinforcing layers with curved fibres, such as flat, curved, braided layers and spiral fabric layers to be assembled. However, these flat elements must be formed into the geometrical shape of the component to be produced (for example, C-sectioned frames or L-sectioned shear ties), prior to the infusion of resin. The shaping of these fabrics presents considerable difficulties since the non-impregnated fibres easily stray from the original orientation so as to be arranged in unpredictable ways inconsistent with the design. To overcome this problem, a technology based on a special weaving technique known as "overbraiding" has been developed. In this technique, the reinforcing fibre is woven, by means of special machines, onto a temporary support mandrel having the same curved shape as the component to be produced and having a cross-section such that the section of the component to be obtained can be produced therefrom simply by longitudinal cutting.

However, this innovative technology also has some important limitations. In fact:

it is not possible to orient the reinforcing fibres in all directions, as would be desirable to improve structural performance, but only within a more restricted range, normally within the range of from about +70° to −70° relative to the longitudinal axis of the element to be produced; it is therefore not possible to insert fibres arranged at 90° (relative to the longitudinal axis of the element), which are typical of the lay-up of composite structural components;

the delicacy of the preforms requires them to be supported by the auxiliary weaving mandrels from the time when they are woven until the time of use, creating problems with regard to costs and to transport and storage logistics; a corresponding number of expensive support mandrels is also required;

the cross-sections that can be produced by the overbraiding process are limited to those that can be obtained from a closed C-section; other cross-sections are obtained with difficulties that are accompanied by quality problems, that is: fibre orientation not to design, wrinkles, etc., the sections that can be produced by the overbraiding process are limited to a uniform thickness and cannot have variations relative to the transverse axis of the element, the process for the infusion of the reinforcing preform with resin is particularly complex and limits the types of resin that can be used.

SUMMARY OF THE INVENTION

The object of the present invention is therefore to provide a method of manufacturing a curved element which overcomes the above-mentioned disadvantages of the prior art.

The object is achieved, according to the invention, by a method of manufacturing a curved element of composite material.

The method according to the invention is based on the pre-infusion of flat elements having fibres arranged in a curved orientation and in their use in combination with conventional prepreg layers, provided that they have compatible resin. This enables curved components to be produced with curved fibre orientation without problems of fibre deformation during forming and overcomes the limitations of the overbraiding technique with respect to fibre angles, thickness variations, and logistics.

Preferred embodiments of the invention are defined in the dependent claims.

BRIEF DESCRIPTION OF THE DRAWINGS

Some preferred but non-limiting embodiments of the invention will now be described with reference to the appended drawings, in which.

DETAILED DESCRIPTION OF THE PREFERRED EMBODIMENTS

Figure 1:
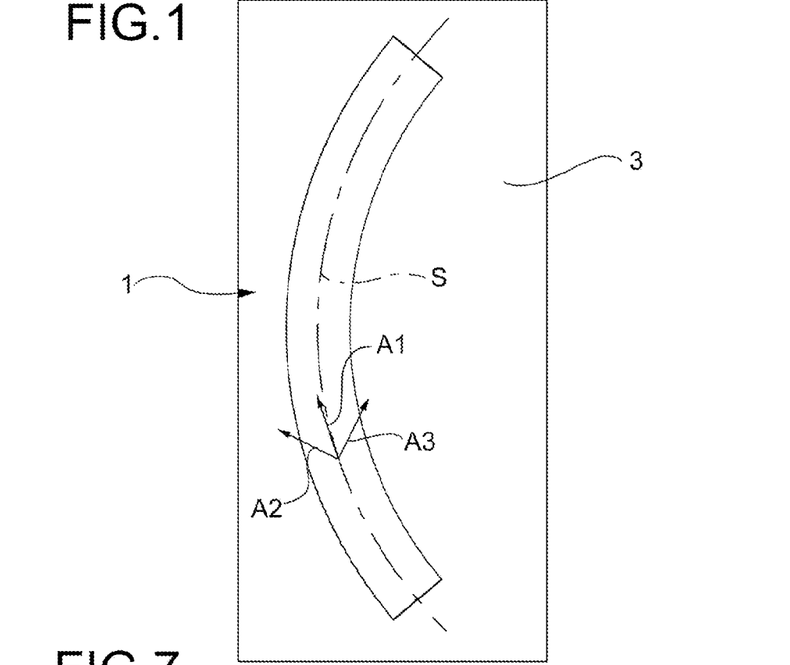
FIG. 1 is a plan view of an example of a preform for the production of a curved element.

FIG. 1 shows, by way of example, a dry preform 1 as the starting material for the production of a curved element by the method according to the invention, arranged on a base platform 3. The preform 1 has substantially the shape of a flat strip and is arranged so as to be curved in the plane of the strip, that is, in the plane defined by the support surface of the platform 3. This curved arrangement is shown in the drawing by a curved principal axis S.

The dry preform 1 is constituted by a layer of reinforcing fibres in which a first predefined percentage A1 of the fibres have a curved orientation, that is, substantially parallel to the axis S, a second predefined percentage A2 of the fibres have a straight arrangement with an orientation inclined at between 0 and +70 degrees to the axis S, and a third predefined percentage A3 of the fibres have a straight arrangement with an orientation inclined at between 0 and −70 degrees to the axis S. The orientations of these three fibre percentages are shown, by way of indication, by respective arrows A1, A2 and A3 in FIG. 1. This arrangement is achieved by a conventional braiding technique. The braiding of the fibres of the three different fractions with different arrangements enables a firm fabric to be obtained in which the fibres do not move because they are braided. The percentage for each orientation is selected on the basis of the load requirements but with constraints resulting from the need to stabilize the orientations of the fibres by means of the braiding. A flat reinforcing layer is thus obtained. Instead of the braiding technique, the reinforcing layer may also be prepared by other conventional techniques such as tow placement and spiral weaving techniques which may be selected according to the structural characteristics to be obtained in the finished curved element. The geometrical characteristics (radius of curvature, width in a radial direction, circumferential length) and the physical characteristics (type of reinforcing fibre, weight per unit area of the fibres) are selected according to the structural characteristics of the finished curved element. The curved fibres of the reinforcing layer 1 thus have predefined orientations relative to the axis S which are established at the stage of the production of the reinforcing layer 1 and are dependent on the desired characteristics of the finished element.

According to the invention, the dry, flat reinforcing layer 1 thus obtained is combined with a resin film, indicated 2 in FIGS. 2 to 6. Controlled temperature and pressure are then applied to bring about the infusion, i.e. the penetration of the resin into the reinforcing layer and to obtain a layer of pre-infused material, indicated 1' in FIGS. 5 to 8.

According to a first embodiment, this pre-infusion stage takes place discontinuously in a vacuum bag in which the pressure necessary for the infusion is exerted by the vacuum bag in which a vacuum is produced.

This discontinuous pre-infusion requires the resin film to be cut beforehand to a geometrical shape similar to that of the reinforcing layer 1 to be pre-infused, with care being taken that the overall weight of the resin is in the correct proportion relative to the overall weight of the layer to be pre-infused.

Once the layer of reinforcing fibre 1 and the layer/s of resin 2 have been combined on the base platform 3, a vacuum bag is prepared for the pre-infusion process. The vacuum bag can be put into effect in many ways, some of which are listed below.

Figure 2:
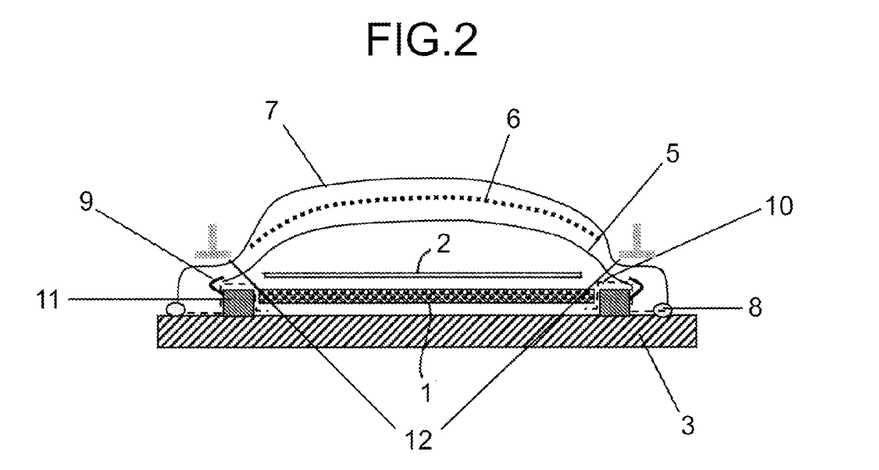
FIG. 2 is a schematic view showing, in section, a vacuum bag for the pre-infusion of the preform of FIG. 1 according to a first embodiment of a pre-infusion stage of the method according to the invention.

A first method, which is now described with reference to FIG. 2, provides for a layer of release film 5, for example a non-perforated, fluorinated ethylene-propylene film (FEP), a layer of breather fabric 6, and a layer of nylon film 7, sealed onto the base platform by the peripheral positioning of sealing tape 8, to be positioned, in order, over the assembly of reinforcing fibres 1 and resin film 2. The release film 5 is fixed, by means of an adhesive tape 9, to a peripheral ventilation system comprising a strip of breather fabric 10 and a peripheral material 11 for rendering the pressure within the vacuum bag homogeneous. Suitable valves 12 are positioned on the nylon film for the application of the vacuum which is produced by means of a pump or other suitable mechanism.

Figure 3:
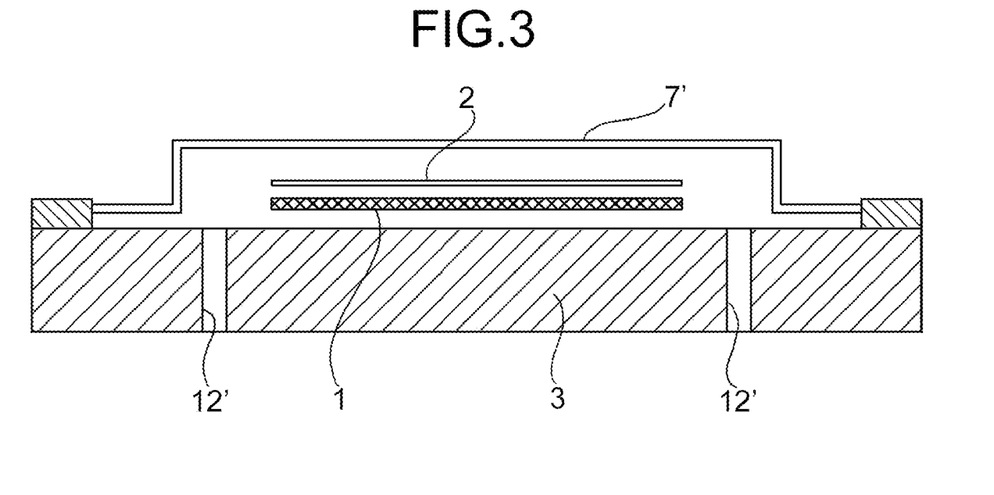
FIG. 3 is a schematic view showing, in section, a membrane device for the pre-infusion of the preform of FIG. 1 according to a variant of the first embodiment of the pre-infusion stage of the method according to the invention.

A second method of putting the vacuum bag into effect, which is now described with reference to FIG. 3, may be to use a silicone rubber membrane 7' which can be sealed onto the base platform 3 by means of gaskets and which, again, must have holes 12' for the application of the vacuum by means of a pump or other suitable device.

Figure 4:
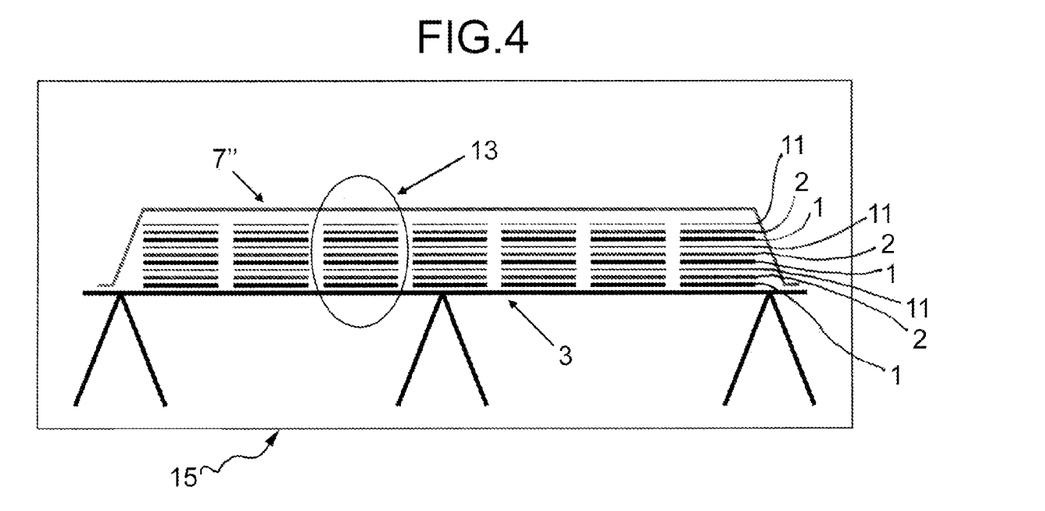
FIG. 4 is a schematic view showing, in section, a vacuum bag for the pre-infusion of a plurality of preforms according to a variant of the first embodiment of the pre-infusion stage of the method according to the invention.

A third method, which is now described with reference to FIG. 4, provides for a plurality of reinforcing layers 1 combined with respective resin films 2 and release films 11 to be arranged on top of one another in piles 13 under the same vacuum bag 7", prepared on the base platform 3. The release film 11 is interposed between each pair of layers comprising a reinforcing layer 1 and a resin film 2 and the pair arranged above it to prevent undesired adhesion between them. A plurality of layers of pre-infused material can thus be produced simultaneously.

Once the vacuum bag 7, 7', 7" has been prepared, a pre-infusion cycle is performed by the programmed application of heat and vacuum. In particular, the process provides for the vacuum to be applied at the moment at which the rise in temperature has brought the resin 2 to a fairly low viscosity so that it can penetrate into the dry fabric 1 under the effect of the vacuum, bringing about the pre-infusion thereof. However, the temperature must not exceed a limit value corresponding to the activation of the polymerization reaction of the resin. The combined vacuum and temperature cycle may alternatively be performed with the use of:

- an oven (schematically indicated 15 in FIG. 4) which is provided with vacuum taps and in which the assembly can be positioned,
- a heated table provided with a vacuum pump; this system is particularly suitable in conjunction with the use of the membrane vacuum bag since the overall time required for the pre-infusion process is minimized.

According to a second embodiment, the pre-infusion stage takes place semi-continuously.

Figure 5:
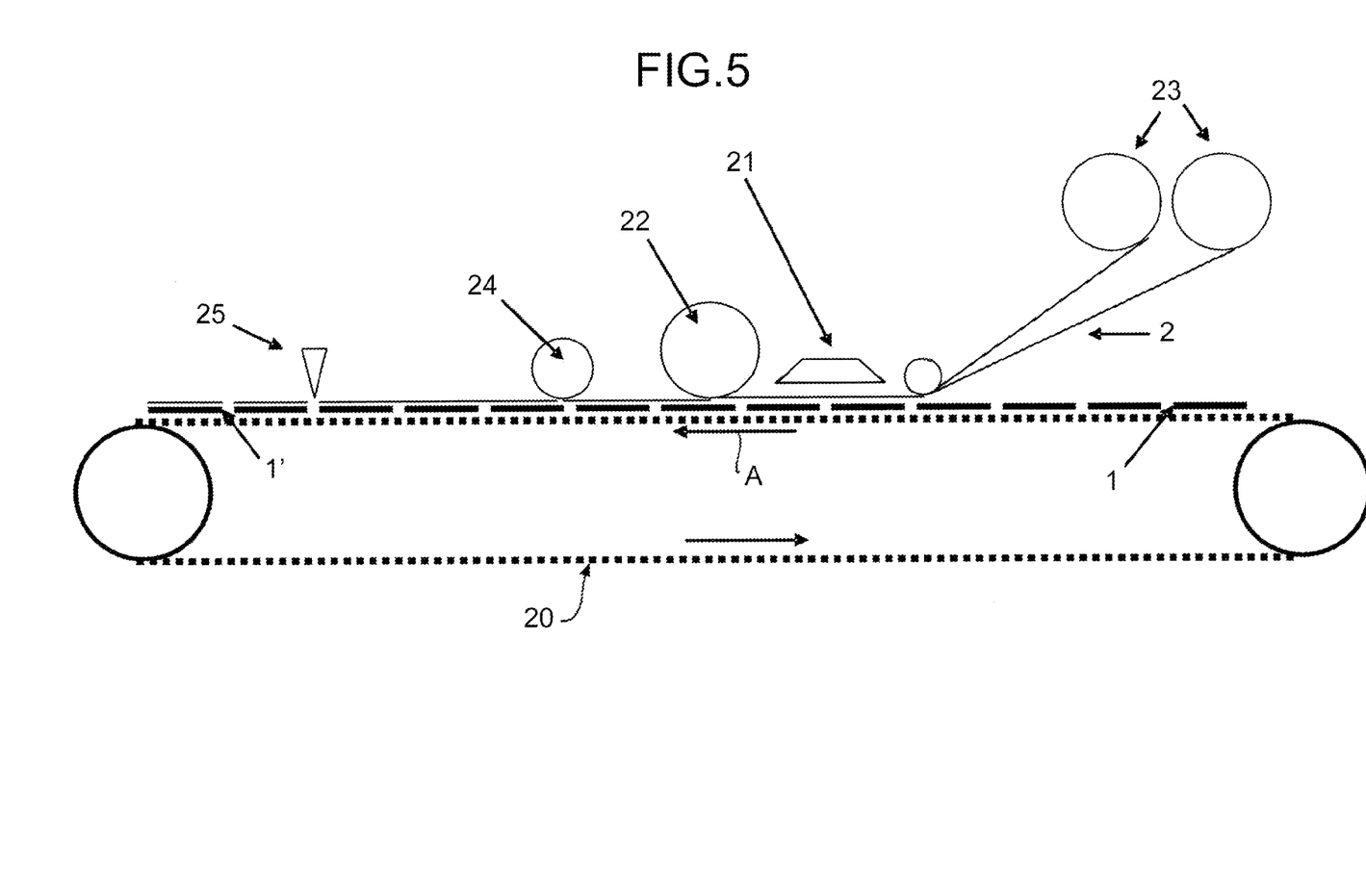
FIGS. 5 and 6 are a schematic side view and a schematic plan view, respectively, of apparatus for the pre-infusion of a plurality of preforms according to a second embodiment of the pre-infusion stage of the method according to the invention.
Figure 6:
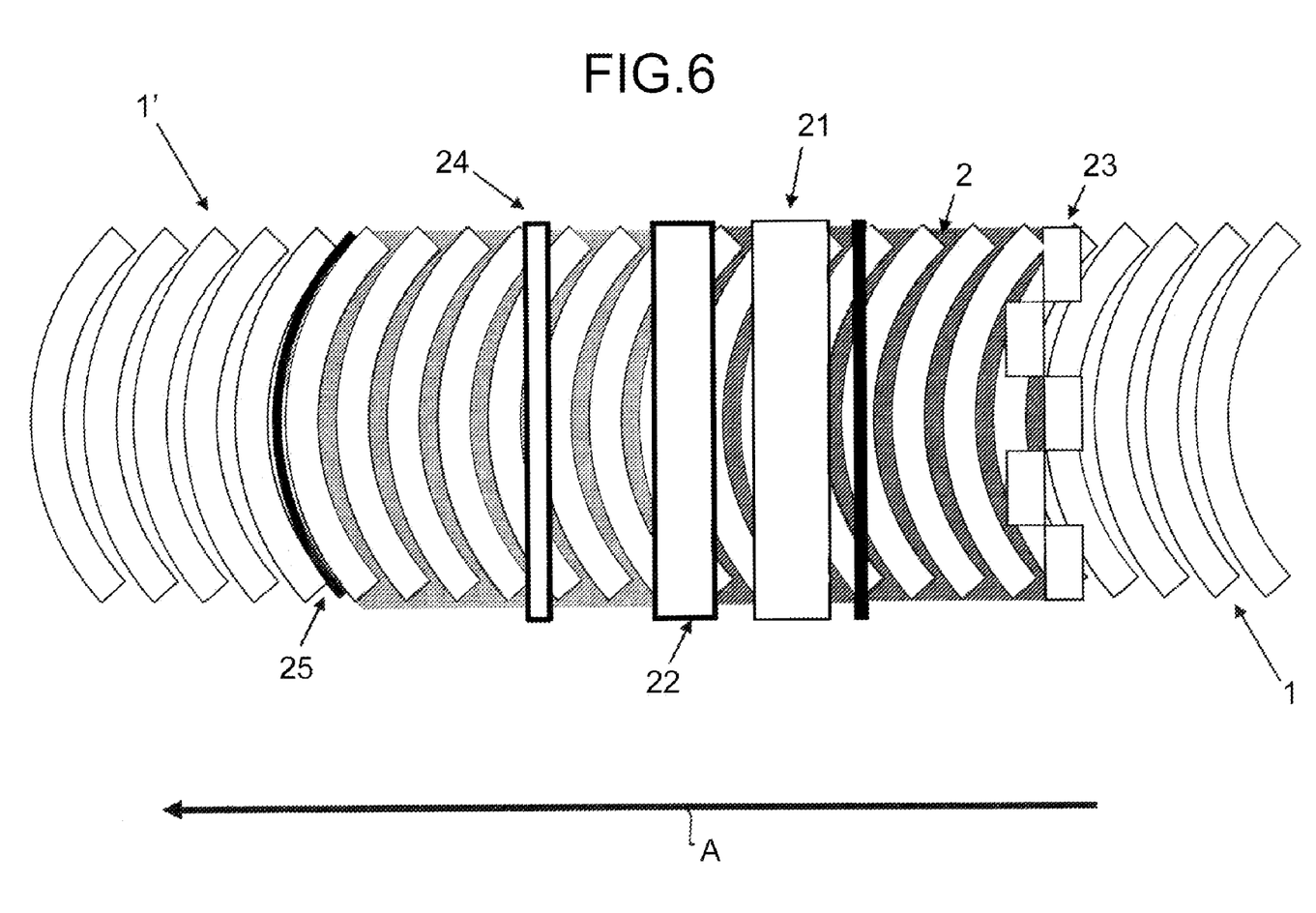

The semi-continuous pre-infusion process, which is now described with reference to FIGS. 5 and 6, enables several reinforcing layers to be covered with a resin film of a width suitable to cover the reinforcing layers continuously.

This process provides for a series of dry reinforcements 1 to be positioned on a conveyor belt 20; the reinforcements are pre-infused by means of one or more continuous resin films 2 which are heated to the required temperature beforehand by means of heaters 21 and are caused to penetrate into each reinforcement 1 with the aid of compression rollers 22.

The process provides for the use of several continuous rolls of resin film 23, the unwinding of the resin film 2, the positioning of the film 2 on the reinforcements 1, the heating of the film 2, the pre-infusion of the film, the consolidation of the film in the reinforcement by passage through cooling rollers 24, and the separation of the infused preforms 1' by cutting of the excess resin film with cutting devices 25. The arrows A in FIGS. 5 and 6 indicate the direction of movement of the conveyor belt 20.

Figure 7:
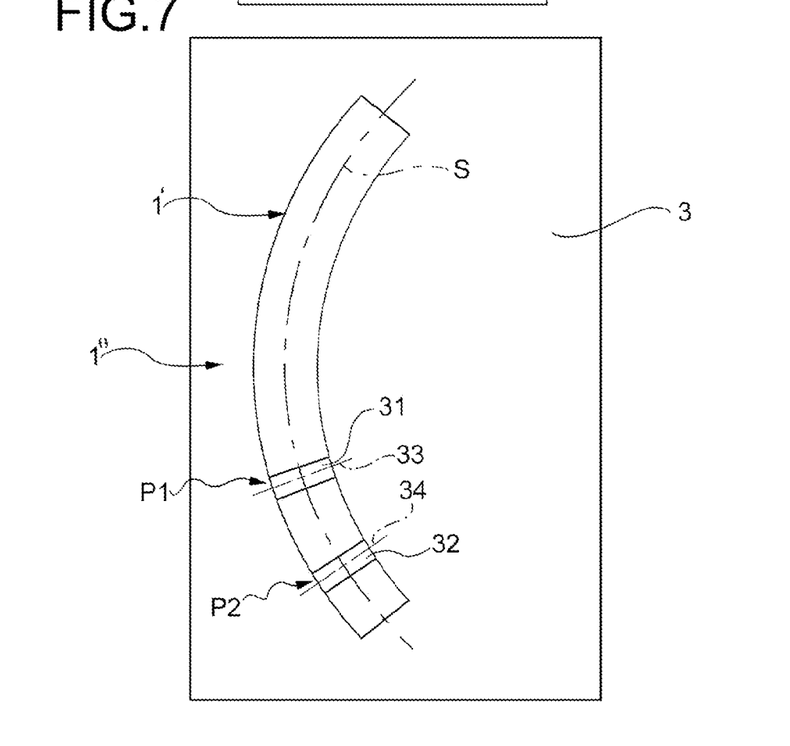
FIG. 7 is a plan view of an example of a layered structure obtained from the preform of FIG. 1.
Figure 8:
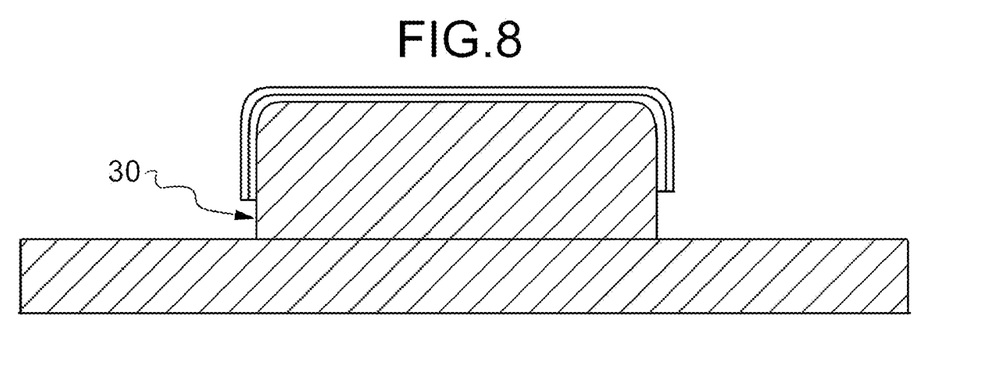
FIG. 8 is a section through the layered structure of FIG. 7, arranged on a support tool.

The method according to the invention then provides for the preparation of one or more prepreg layers, indicated 31 and 32 in FIGS. 7 and 8, which are formed by straight fibres impregnated with resin compatible with the resin of the pre-infused material, for use mainly to introduce angular orientations greater than 70 degrees into the laminate and/or to produce local increases in thickness.

For the purposes of the invention, the term "prepreg" means, in conventional manner, a semi-finished product comprising straight reinforcing fibres and a resin matrix in which the fibres are immersed. The fibres may be arranged in different configurations, for example in a unidirectional layer, in two layers having different orientations, or as fabric. The prepregs are generally prepared in tape form and wound in rolls.

The method then provides for the layer/s 1' of pre-infused material and the prepreg layer/s 31, 32 to be superimposed on one another in a predetermined arrangement so as to obtain a layered structure 1". This layering is performed by positioning the layers with the fibre orientations required by the design, in accordance with the design of the finished component. By way of example, prepreg layers are applied to the pre-infused preform 1' shown in FIG. 7, in positions indicated P1 and P2, thus forming the layered structure 1". The axes 33 and 34 which are arranged in the positions P1 and P2 and are perpendicular to the principal axis S of the pre-infused preform 1' indicate the orientations of the straight fibres of the prepreg layers 31 and 32 relative to the principal axis S.

The layering operation may be performed in two different ways.

A first method provides for direct layering by:
cutting each layer to shape with the use of templates and hand cutters or automatic, numerically-controlled cutting systems,
lamination of each layer directly on a support tool for the polymerization of the component, indicated 30 in FIG. 8, by performing suitable intermediate compaction steps by means of a vacuum bag, in accordance with conventional practice.

A second method provides for layering and hot forming in accordance with the following steps:
cutting of each layer to shape using templates, and hand cutters or automatic, numerically-controlled cutting systems,
layering of the various layers in a flat arrangement, as shown in FIG. 7,
positioning on a forming tool and forming of the "raw" layered structure 1" in one or more stages by the application of vacuum and heat,
positioning of the formed layered structure 1" on the support tool 30 for polymerization; as a variant of the method, the polymerization tool 30 may correspond to the forming tool.

Once the layering has been performed, a vacuum bag is put into effect with the use of the materials that are known in the field, for example, starting with the layered structure 1''', release film, breather fabric, and bag film sealed onto the edges of the polymerization tool, and the affixing of vacuum valves to the bag film.

Finally, the element is polymerized and compacted by the execution of a combined pressure and temperature cycle to bring about the compaction of the layers and activate the polymerization of the resin. In some applications, the application of the vacuum and heating alone suffices for the compaction and polymerization of the element.

As will be appreciated, the innovative process proposed affords considerable advantages over the prior art.

In fact, the reinforcement layers with curved, pre-infused fibres combined with conventional prepreg layers enable important curved structural elements to be produced without:
risk of straying of the orientation of the fibres which is typical of processes in which the flat reinforcement layers have to be deformed to the final shape of the component without the stabilizing effect of the resin,
limitations on the orientations of the fibres such as those that are imposed by the overbraiding technique which does not allow the layering to have fibres with orientations greater than 70° to the principal axis of the element (S in the embodiment illustrated);
wrinkles in the fibres, which would be produced if it were attempted to deform conventional prepregs with straight fibres to cause them to adopt a curved shape.

The invention claimed is:

1. A method of manufacturing a curved element made of composite material, comprising the following steps:
a) preparing a dry, flat preform comprising at least one dry, flat reinforcing layer with curved fibres, said dry, flat preform being elongated along a curved longitudinal axis,
b) combining a resin film with the dry, flat preform,
c) applying heat and pressure to the combined preform and resin film in a controlled manner to bring about the infusion of the resin into the preform and to obtain at least one layer of pre-infused preform,
d) preparing at least one prepreg layer with straight fibres impregnated with resin compatible with the resin of the pre-infused preform,
e) superimposing the pre-infused preform and the at least one prepreg layer on one another in accordance with a predetermined flat arrangement, to obtain a layered structure, wherein the straight fibres of the prepreg layer are oriented at an angle greater than 70 degrees to the longitudinal axis of the preform,
positioning the layered structure on a tool for hot forming the layered structure to obtain a layered and hot-formed structure, and
positioning the layered and hot-formed structure on a shaped support tool; and
f) subjecting the layered and hot-formed structure, arranged on the shaped support tool, to a polymerization cycle to obtain the curved element.

2. A method according to claim 1 wherein step c) takes place in a vacuum bag in which the pressure is applied by the production of a vacuum.

3. A method according to claim 2 wherein step c) is preceded by a step of preparing a vacuum bag, in which the combined preform and resin film are arranged on a base platform, and in which a layer of release film, a layer of breather fabric, and a layer of vacuum bag film that is sealed peripherally onto the base platform and is provided with valves for the application of the vacuum, are positioned, in order, on the combined preform and resin film.

4. A method according to claim 2 wherein step c) is preceded by a step of preparing a vacuum bag, in which the combined preform and resin film are arranged on a base platform provided with holes for the application of the vacuum, and in which a vacuum bag membrane that is sealed peripherally onto the base platform is positioned on the combined preform and resin film.

5. A method according to claim 2 wherein step c) takes place for a plurality of preforms combined with respective resin films and arranged in piles, in which each preform combined with resin film is separated from the layer above by a layer of release film.

6. A method according to claim 1 wherein steps b) and c) take place continuously, in which a plurality of dry preforms are transported by belt conveyor, and in which the preforms are pre-infused by a continuous resin film heated beforehand and is caused to penetrate into the preforms in succession by compression rollers.

7. A method according to claim 6 wherein the pre-infused preforms are separated from one another by cutting of the excess resin film.

8. A method according to claim 1 wherein step e) takes place directly on the shaped support tool.

* * * * *